(12) United States Patent
Chen (10) Patent No.: US 6,447,221 B1
(45) Date of Patent: Sep. 10, 2002

(54) STRUCTURE OF DRILLING MACHINE

(76) Inventor: Mei-Tung Chen, 1F, No. 228, Chung Ching N. Rd. Sec. 3, Taipei (TW)

(*) Notice: Subject to any disclaimer, the term of this patent is extended or adjusted under 35 U.S.C. 154(b) by 0 days.

(21) Appl. No.: 09/797,606

(22) Filed: Mar. 5, 2001

(51) Int. Cl.7 .............................................. B23B 45/00
(52) U.S. Cl. .................... 408/113; 408/241 S; 409/206
(58) Field of Search .......................... 408/14, 110, 113, 408/241 S; 409/182, 206, 210, 218

(56) References Cited

U.S. PATENT DOCUMENTS

| | | | | |
|---|---|---|---|---|
| 2,382,639 A | * | 8/1945 | Kennard | 408/110 |
| 4,674,927 A | * | 6/1987 | Khurana | 408/110 |
| 5,829,931 A | * | 11/1998 | Doumani | 144/251.1 |

FOREIGN PATENT DOCUMENTS

GB     566231 A  * 12/1944  ............. 408/241 S

* cited by examiner

*Primary Examiner*—Daniel W. Howell
(74) *Attorney, Agent, or Firm*—Dennison, Schultz & Dougherty (57) ABSTRACT

A structure of a drilling machine having a main machine provided on one end thereof with a control switch, with this, by pressing the control switch to position a clamping portion for a bit, the bit can be changed conveniently; and an adjusting and fixing seat can be fast connected to the periphery of the clamping portion. The adjusting and fixing seat includes a fixing seat and an adjusting rack stacking with each other by means of the vertical walls respectively provided on the peripheries of the two, and a latching bolt and a control piece are pivotally connected to the vertical walls. By pressing the control piece, the adjusting rack can be fast adjusted for its desired height, so that the bit can be used to drill a hole of a desired depth.

12 Claims, 7 Drawing Sheets

STRUCTURE OF DRILLING MACHINE

BACKGROUND OF THE INVENTION

The present invention is related to the structure of a drilling machine convenient for changing its drill bit, and for fast adjustment of the desired depth of drilling, and especially to the structure suiting a drilling machine or the like.

Conventional drilling machines generally are provided with clamping portions for changing drill bits, and the desired depths of drilling are all decided following the feeling of operators, if the holes drilled are too shallow, many times of repeated drilling are required; and either case that the holes drilled are too deep or the workpieces are pierced is not desired.

Figure 7:
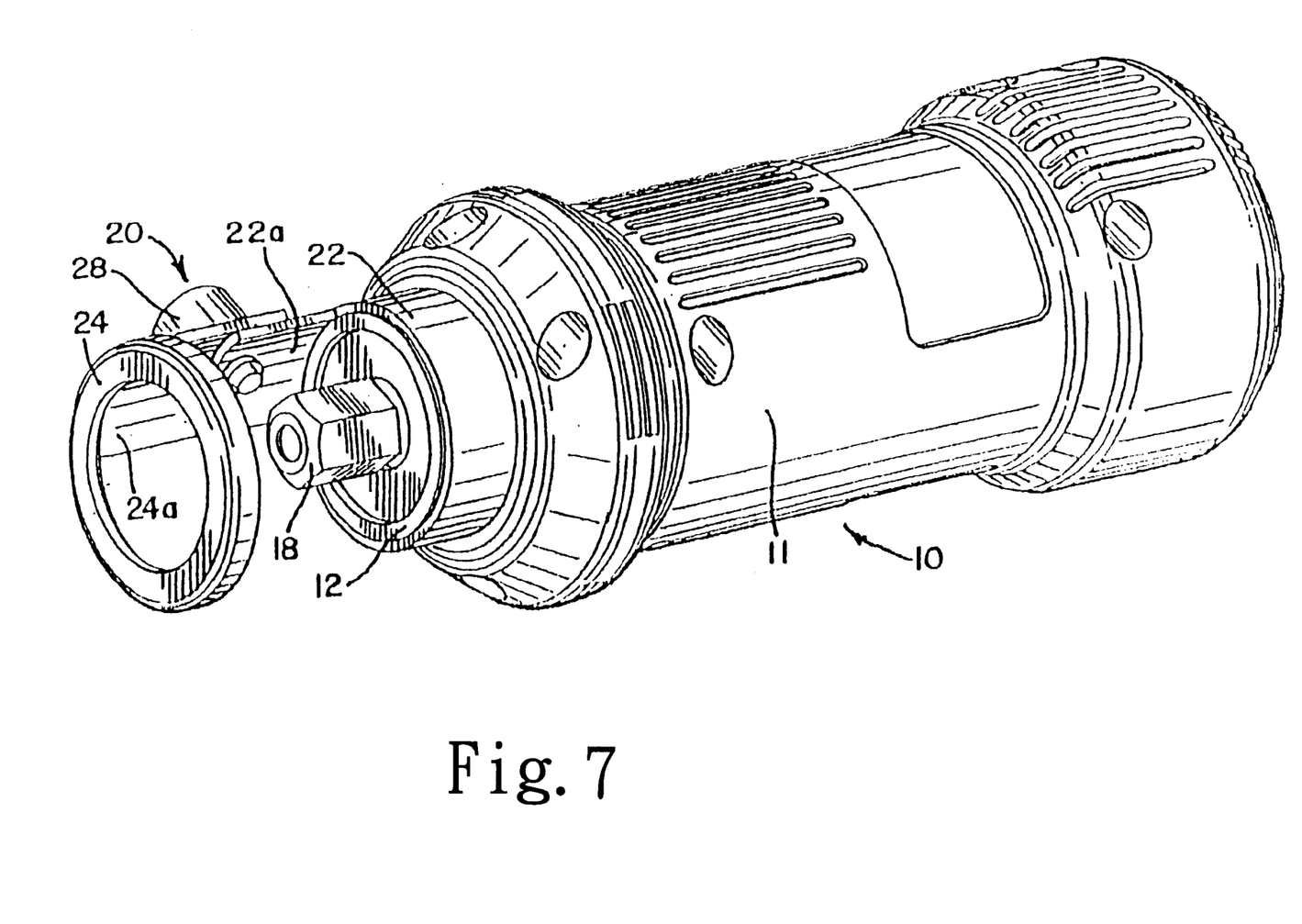
FIG. 7 is a perspective view of a conventional structure of drilling machine.

In order to get rid of the defects in drilling, another structure of drilling machine has been disclosed, such as the "REMOVABLE DEPTH GUIDE FOR ROTARY CUTTING TOOL" of the U.S. Pat. No. 5,829,931 (as shown in FIG. 7); the drilling machine 10 of such structure has a clamping portion 18 for the bit with an axle collar 22 over it. The axle collar 22 has an extended arm 22a extending outwardly therefrom and provided with a screw hole. An abutment seat 24 with a similar shape as that of the axle collar 22 is stacked with an extended arm 24a thereof on the extended arm 22a of the axle collar 22. The extended arm 24a is provided thereon with an elongate slot, a screw 28 is extended through the elongate slot and the screw hole respectively of the extended arm 24a and the extended arm 22a; by screwing off or on of the screw 28, the height of the abutment seat 24 can be adjusted to get the object of having a suitable drilling depth. However, in practice, the drilling machine has the following defects:

1. The axle collar is fixedly provided on the clamping portion of the drilling machine, it is inconvenient in changing the bit.
2. The axle collar is fixed to the abutment seat by means of a screw, screwing off or on of the screw is easy, however, it can not get the object of fast adjustment, and thereby is not desired.

SUMMARY OF THE INVENTION

In view of the defects of the conventional drilling machines, the inventor of the present invention studied and developed the present invention based on his professional knowledge and practical experience of years in designing and marketing of the related products, in order to provide convenience in use for the consumers, and this is the motive of the present invention.

The primary object of the present invention is to provide a structure of drilling machine, by providing a control rod on an adjusting and fixing seat, a desired height of the adjusting and fixing seat can be fast acquired.

The secondary object of the present invention is to provide a structure of drilling machine having an adjusting and fixing seat which can be fast assembled and detached.

To get the stated objects, the present invention is provided with a main machine of the drilling machine, the main machine is provided on one end thereof with a control switch. By pressing the control switch to position the clamping portion for a bit, the bit can be changed conveniently, and the adjusting and fixing seat can be fast connected to the periphery of the clamping portion. The adjusting and fixing seat includes a fixing seat and an adjusting rack to be stacked with each other by means of the vertical walls respectively provided on the peripheries of the two, and a latching bolt and a control piece are pivotally connected to the vertical walls. By pressing the control piece, the adjusting rack can be fast adjusted for its desired height, so that the bit can be used to drill a hole of a desired depth.

The present invention will be apparent in its particular structure and characteristics after reading the detailed description of the preferred embodiment thereof in reference to the accompanying drawings.

DETAILED DESCRIPTION OF THE PREFERRED EMBODIMENT

Figure 2:
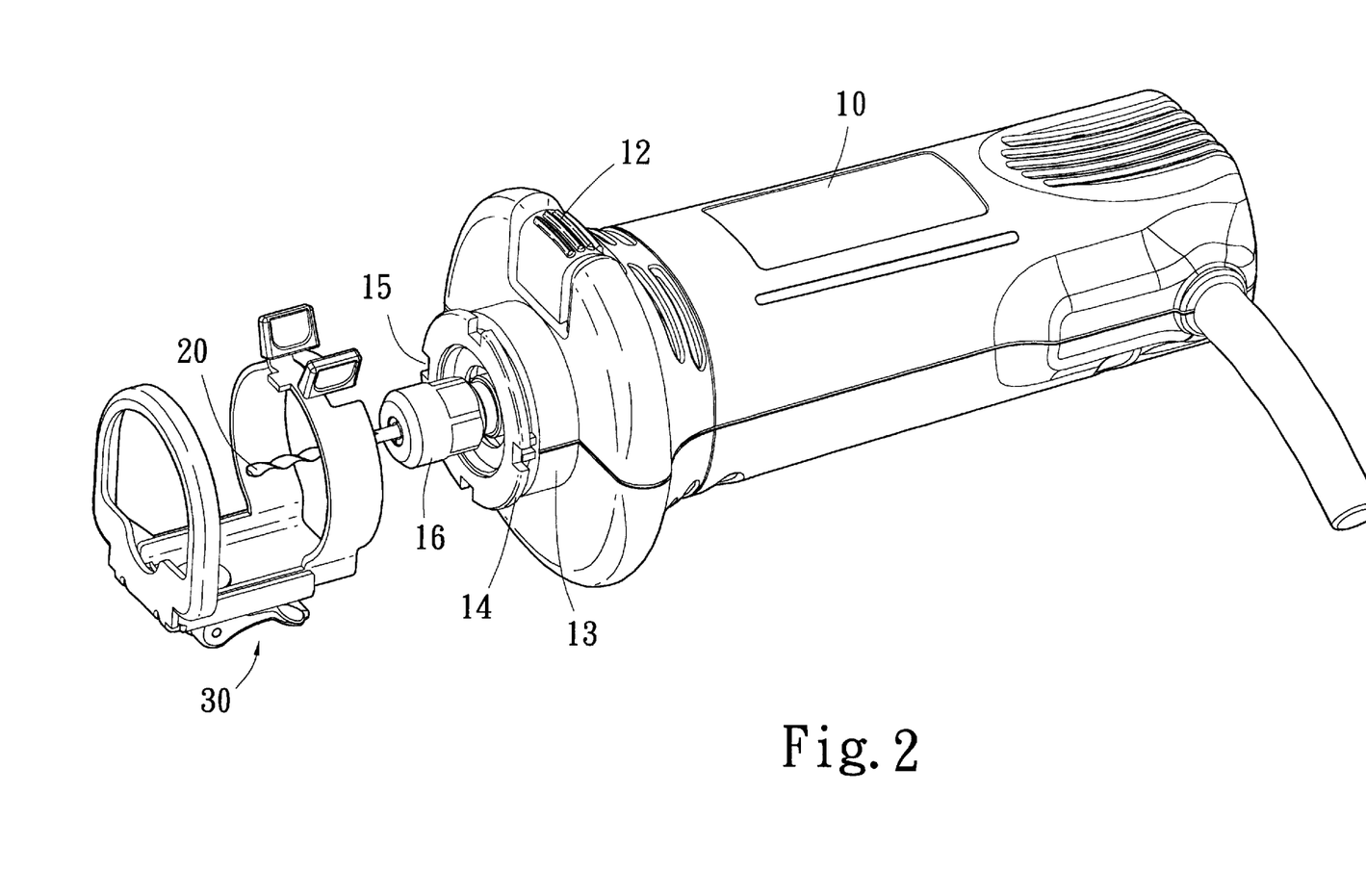
FIG. 2 is an analytical perspective view of the embodiment of present invention.

The drilling machine of the present invention is comprised of a main machine 10 and an adjusting and fixing seat 30. As shown in FIG. 2, the main machine 10 is provided on one end thereof with a general switch 11 and a power line, and on the other end thereof with an axially oriented clamping portion 13 of which the front end is provided with a positioning annular member 14 which has at least an engaging groove 15. In the preferred embodiment of the present invention, there are four engaging grooves 15 on the positioning annular member 14. The clamping portion 13 is provided with a chuck 16 at the center thereof for clamping a bit 20, and is provided with a press switch 12 on the top thereof in an upright position. By pressing the press switch 12, the chuck 16 can be released for changing the bit 20.

Figure 3:
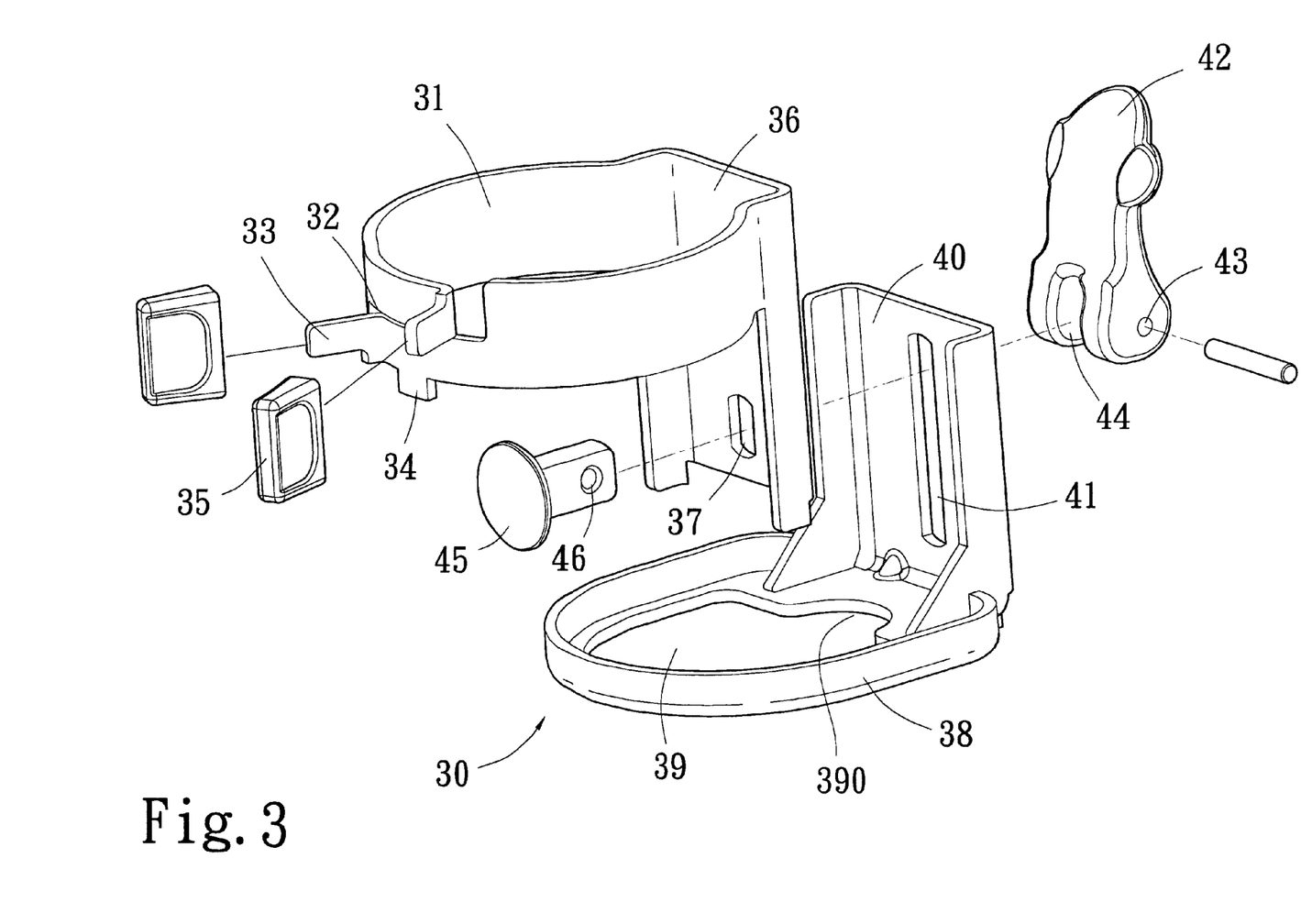
FIG. 3 is an analytical perspective schematic view showing the elements of the adjusting and fixing seat of the present invention.

Referring also to FIG. 3, the adjusting and fixing seat 30 includes two members with identical shape and arranged in opposition to each other, namely a fixing seat 31 and an adjusting rack 38 which are connected with each other with a latching bolt 45 and a control piece 42. The fixing seat 31 has a ring with a diameter corresponding to that of the clamping portion 13 and has on the ring a separated portion 32 separated into an upper and a lower arm each with a folded portion 33 having thereon a cap 35. The caps 35 can be pressed to adjust the size of the ring. The lower arm with the lower folded portion 33 is provided on the bottom thereof with an engaging protrusion 34. A vertical wall 36 of suitable length is provided in opposition to the separated portion 32 of the ring and has a hole 37 near an end thereof.

The adjusting rack 38 is a frame with a central opening 39, and has a vertical wall 40 on the frame to be connected with and having the same shape with the vertical wall 36 of the fixing seat 31. The vertical wall 40 is provided with an elongate slot 41. The central opening 39 has a recessed portion 390 near the vertical wall 40.

The latching bolt 45 has a bolt head with a larger area, the shape of the shank thereof fits the hole 37 on the vertical wall 36 of the fixing seat 31. And a hole 46 is provided on the shank.

The control piece 42 is provided at the middle of a thicker end thereof with a recess 44; and is provided on each lateral wall of the recess 44 with a pin hole 43, the pin hole 43 is nearer to the bottom than to the front or the rear edge of the lateral wall.

Figure 1:
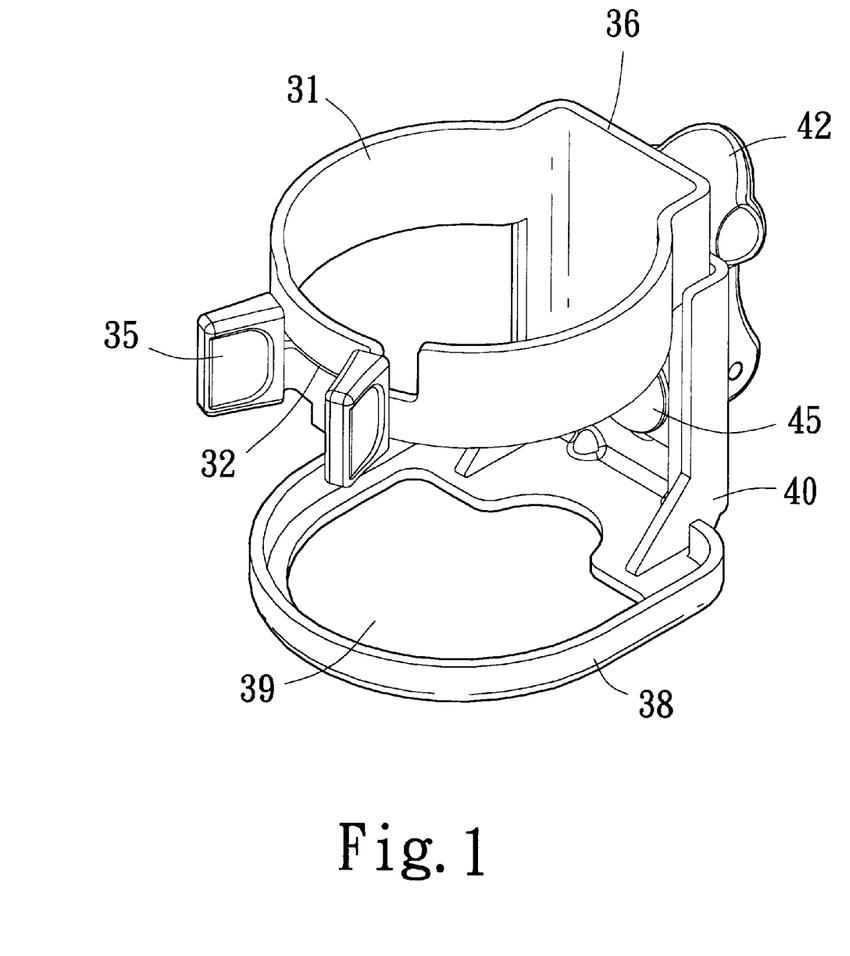
FIG. 1 is a perspective view of an embodiment of present invention.

The fixing seat 31 is disposed in the first place to be mutually opposite to each other with the adjusting rack 38 to have the vertical walls 36, 40 lapped with each other; then the latching bolt 45 is extended into the hole 37, and out of the elongate slot 41 to be received in the recess 44 of the control piece 42; and a pin is used to connect the pin hole 43 and the hole 46. Thereby, when the control piece 42 is moved upwardly, contact between the vertical wall 36, 40 is loosened, the vertical walls 36, 40 can be moved till they are adjusted to get suitable positions; then the control piece 42 can be pressed down to make tight contact of the vertical wall 36, 40, and assembly of the adjusting and fixing seat 30 is completed (a shown in FIG. 1).

Figure 4:
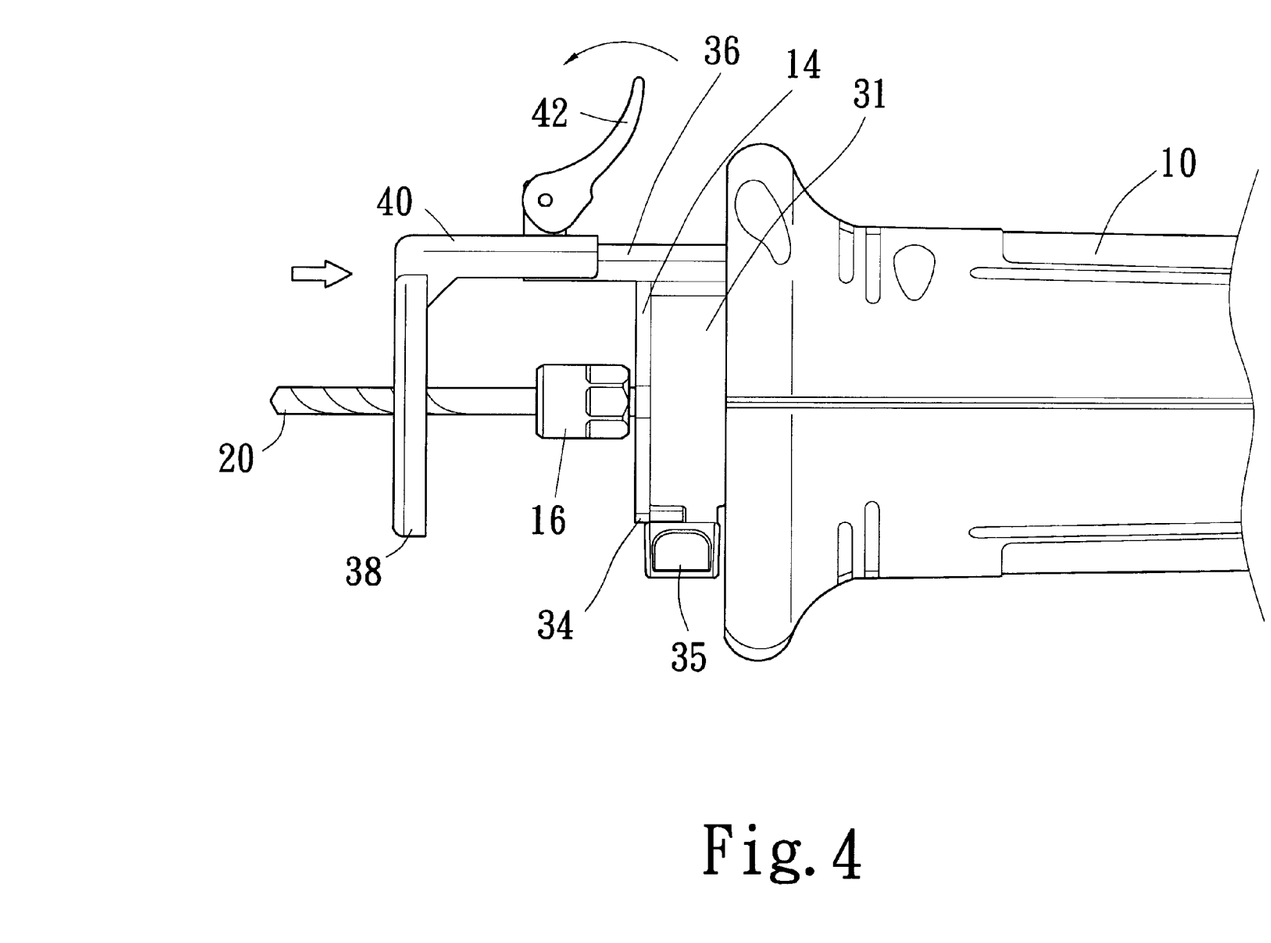
FIGS. 4, 5 are schematic views showing adjustment of distance by the adjusting and fixing seat of the present invention.
Figure 5:
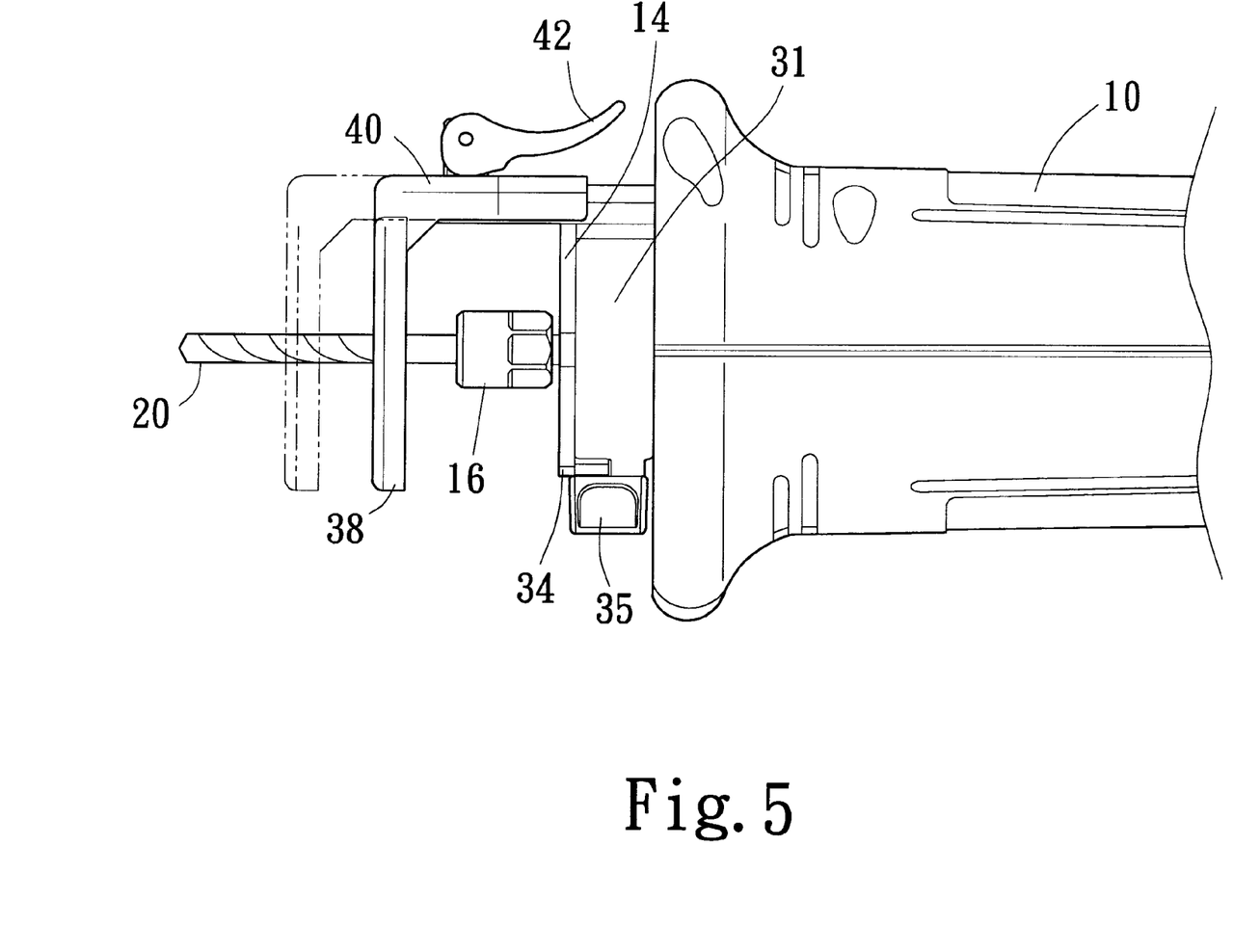

Referring to FIG. 2, connecting of the adjusting and fixing seat 30 with the main machine 10 of the drilling machine is easy; it needs only to press the caps 35 of the adjusting and fixing seat 30 to make opening of the ring of the fixing seat 31 to render its diameter larger than that of the positioning annular member 14 of the clamping portion 13, then the ring can be fitted over the clamping portion 13. Now the engaging protrusion 34 of the ring can be engaged randomly in one of the engaging grooves 15 of the positioning annular member 14 for positioning. When the length of the adjusting rack 38 is too long or too short and requires adjustment, as shown in FIGS. 4 and 5, the control piece 42 is moved upwardly, the adjusting rack 38 then can slide frontwards and rearwards to desired positions to render the distance from the tip of the bit to the adjusting rack 38 equal to the depth desire for drilling, and then the control piece 42 can be pressed down to make tight contact of the vertical wall 36, 40. Adjustment of depth thereby is very convenient.

Moreover, when it is to change the bit 20, the caps 35 can be directly pressed to open the ring of the fixing seat 31, the entire adjusting and fixing seat 30 can thus be separated from the clamping portion 13 of the drilling machine, and then by pressing the press switch 12, the bit 20 can be conveniently changed without hindering.

Figure 6:
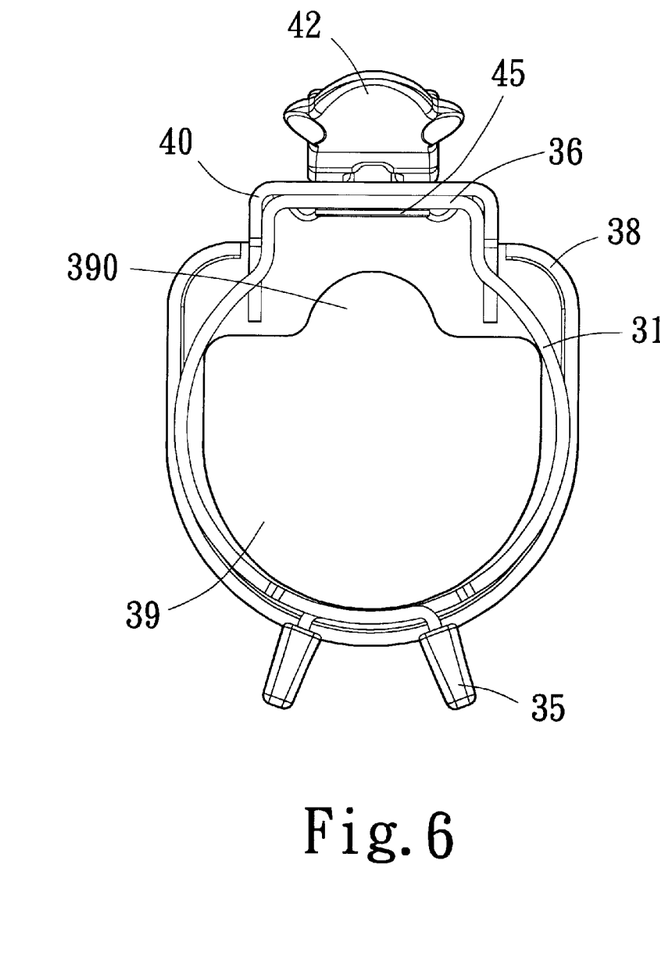
FIG. 6 is a bottom view of the embodiment of present invention.

Referring to FIG. 6, by providing the recessed portion 390 on the central opening 39 of the adjusting rack 38, if it is not desired to have the fixing seat 30 separated from the clamping portion 13 of the drilling machine, the recessed portion 390 can allow a finger to extend into the fixing seat 31 to change the bit 20.

The structure of drilling machine of the present invention has the following advantages:

1. The adjusting and fixing seat of the present invention is quite convenient in use, it needs only to move up or press the control piece, the object of adjustment can be fast obtained.
2. It needs only to adjust the height of the adjusting and fixing seat, the desired depth for drilling can be obtained, this can effectively get rid of the defect of uncertain depth of drilling of a conventional drilling machine.
3. The mode of separation of the adjusting and fixing seat from the main machine of the drilling machine is quite convenient and fast, and when the bit of the main machine of the drilling machine is to be changed, the adjusting and fixing seat will not hinder.
4. If it is not desired to have the fixing seat separated from the main machine of the drilling machine, the recessed portion on the adjusting rack with a large area can allow a finger to extend into them to change the bit.

In conclusion, the structure of drilling machine of the present invention is convenient and fast in operation, it is novel, advanced and industrially practical, the structure has never existed in the markets and thereby is patentable.

The above stated structure is only for illustrating a preferred embodiment of the present invention, and not for giving any limitation to the scope of the present invention. It will be apparent to those skilled in this art that various modifications or changes can be made to the elements of the present invention without departing from the spirit and principle of this invention and shall fall within the scope of the appended claims and are intended to form part of this invention.

What is claimed is:

1. A structure of a drilling machine comprising a main machine and an adjusting and fixing seat, wherein, said main machine has a clamping portion which is adapted to being pressed to position a bit; said adjusting and fixing seat is connected to the periphery of said clamping portion, said adjusting and fixing seat includes a fixing seat and an adjusting rack stacking with each other by means of two vertical walls provided respectively on said fixing seat and said adjusting rack, a latching bolt and a control piece are pivotally connected to said vertical walls; by pressing said control piece, said adjusting rack is adapted to fast adjusting its desired height, so that said bit is adapted to drilling a hole of a desired depth.

2. A structure of a drilling machine as in claim 1, wherein, said clamping portion is provided with a positioning annular member which has at least an engaging groove.

3. A structure of a drilling machine as in claim 1, wherein, said fixing seat of said adjusting and fixing seat has a ring with a diameter corresponding to that of said clamping portion and has on said ring a separated portion, said vertical wall of said fixing seat is provided in opposition to said separated portion.

4. A structure of a drilling machine as in claim 3, wherein, said separated portion on said ring is separated into an upper and a lower arm each with a folded portion having thereon a cap, said lower arm with the lower one of said folded portions is provided on the bottom thereof with an engaging protrusion.

5. A structure of a drilling machine as in claim 3, wherein, said vertical wall of said fixing seat has a hole near and at the middle of an end thereof.

6. A structure of a drilling machine as in claim 1, wherein, said adjusting rack of said adjusting and fixing seat is a frame with a central opening, said vertical wall of said adjusting rack is provided on said frame.

7. A structure of a drilling machine as in claim 6, wherein, said vertical wall of said adjusting rack has the same shape as said vertical wall of said fixing seat.

8. A structure of a drilling machine as in claim 6, wherein, said vertical wall of said adjusting rack is provided with an elongate slot.

9. A structure of a drilling machine as in claim 6, wherein, said central opening of said adjusting rack has a recessed portion near said vertical wall of said adjusting rack.

10. A structure of a drilling machine as in claim 1, wherein, the shape of the shank of said latching bolt fits a hole on said vertical wall of said fixing seat, and another hole is provided on said shank.

11. A structure of a drilling machine as in claim 1, wherein, said control piece is provided at the middle of a thicker end thereof with a recess, and is provided on each lateral wall of said recess with a pin hole.

12. A structure of a drilling machine as in claim 11, wherein, said pin holes on said control piece are nearer to the bottoms than to the front or the rear edges respectively of said lateral walls.

* * * * *